Figure 1:
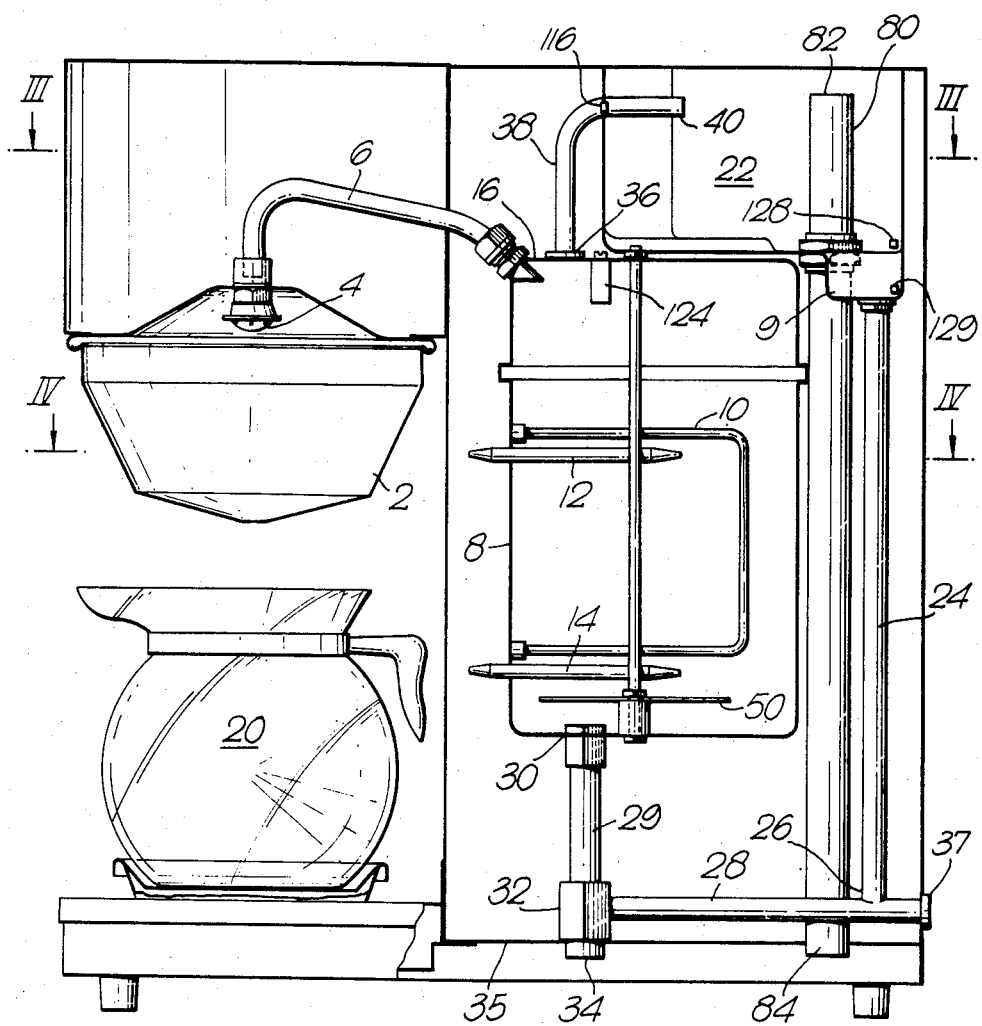

United States Patent [19]

Hayes

[11] Patent Number: 4,653,389
[45] Date of Patent: Mar. 31, 1987

[54] BOILERS OR TANKS FOR HOT WATER

[75] Inventor: Cecil Hayes, Hastings, United Kingdom

[73] Assignee: W. M. Still & Sons Limited, United Kingdom

[21] Appl. No.: 767,747

[22] Filed: Aug. 21, 1985

[30] Foreign Application Priority Data

May 29, 1985 [GB] United Kingdom ............... 8513530

[51] Int. Cl.$^4$ ............................................. A47J 31/057
[52] U.S. Cl. ......................................... 99/280; 99/283; 99/300; 219/297
[58] Field of Search ................. 99/279, 280, 281, 283, 99/285, 290, 293, 294, 300, 304, 307; 219/297, 312, 323, 324

[56] References Cited

U.S. PATENT DOCUMENTS

| | | | |
|---|---|---|---|
| 3,106,149 | 10/1963 | Vukasin | 99/283 |
| 3,485,162 | 12/1969 | Hopkinson | 99/283 |
| 4,464,981 | 8/1984 | Stover | 99/280 |
| 4,531,046 | 7/1985 | Stover | 99/281 |
| 4,575,615 | 3/1986 | Shigenobu | 99/279 X |

Primary Examiner—Billy J. Wilhite
Attorney, Agent, or Firm—Wood, Herron & Evans

[57] ABSTRACT

A hot water tank particularly for a beverage brewing apparatus of the infusion type in which the hot water tank has a water draw-off tap at a position between the top and bottom of the tank and a thermostat above the outlet in the tank to the tap and a control means connected to the thermostat such that water may only be drawn off through the tap when the temperature of water above the tap outlet is at least as high as a predetermined temperature. The controller ensures that the user cannot draw water from the tank until the temperature of the water reaches the predetermined temperature. A water supply to the tank bottom ensures that the tank is kept full of water and in the case of the brewing apparatus this ensures feeding of hot water to an infusion spray head. Preferably the tap is prevented from being enabled to draw off water while infusion is taking place due to the provision of a control valve in the connection between the tap and the water tank.

11 Claims, 7 Drawing Figures

BOILERS OR TANKS FOR HOT WATER

This invention relates to boilers or tanks for hot water.

Hitherto when water is to be drawn off from a tank or boiler of hot water, the tap has normally been connected at or adjacent the bottom of the tank or boiler with the result that the whole tank has had to be heated to the desired temperature before water at that temperature could be drawn off.

Furthermore water may be, and often is, drawn off before it has reached the desired temperature.

A hot water tank or boiler in accordance with this invention has a water draw-off tap connected thereto at a point between the top and bottom of the tank and a valve is provided to prevent water reaching the tap until the water in the tank above the point of connection to the tap is at a predetermined temperature.

In this way water cannot be drawn off until that to be discharged is at a predeterined temperature whilst at the same time water may be drawn off before the whole tank has reached the desired temperature. Such a tank or boiler may be incorporated in a coffee or tea making apparatus such as that forming the subject of co-pending application No. 768,023 filed herewith. In this case an upper thermostat probe is positioned in the tank at or slightly above the level of connection to the tap and a solenoid valve is connected to the thermostat operated by this upper probe. The solenoid valve remains closed as and until the water in the upper portion of the tank and above the thermostat probe reaches a predetermined set temperature whereupon the thermostat operates to open the valve to allow hot water to be dispensed from the tank. The valve is closed when water has been dispensed and the temperature of the water in the upper part of the tank has dropped, and until the thermostat is again operated when the water in the upper portion of the tank again reaches the desired temperature.

When the water in at least the upper portion of the tank has reached the desired temperature then coffee infusion may take place by the pressing of an infusion switch which allows water to enter the apparatus. When the infusion switch is closed the solenoid valve isolating the tap is preferably automatically closed so that hot water cannot be dispensed from the tank during coffee infusion.

Preferably a probe is present in the tank to sense the level of the water, positioned below the point of take-off for the coffee infusion head and above the take-off point for the tap. When the level of water in the tank drops to this level probe, due to take-off of water then a mains water inlet valve is opened to allow water to enter the tank to replace that drawn off. The water is preferably introduced in the bottom of the tank and the water inlet valve is closed when the water level in the tank, or a subsidiary tank, reaches a further water level probe.

Figure 2:
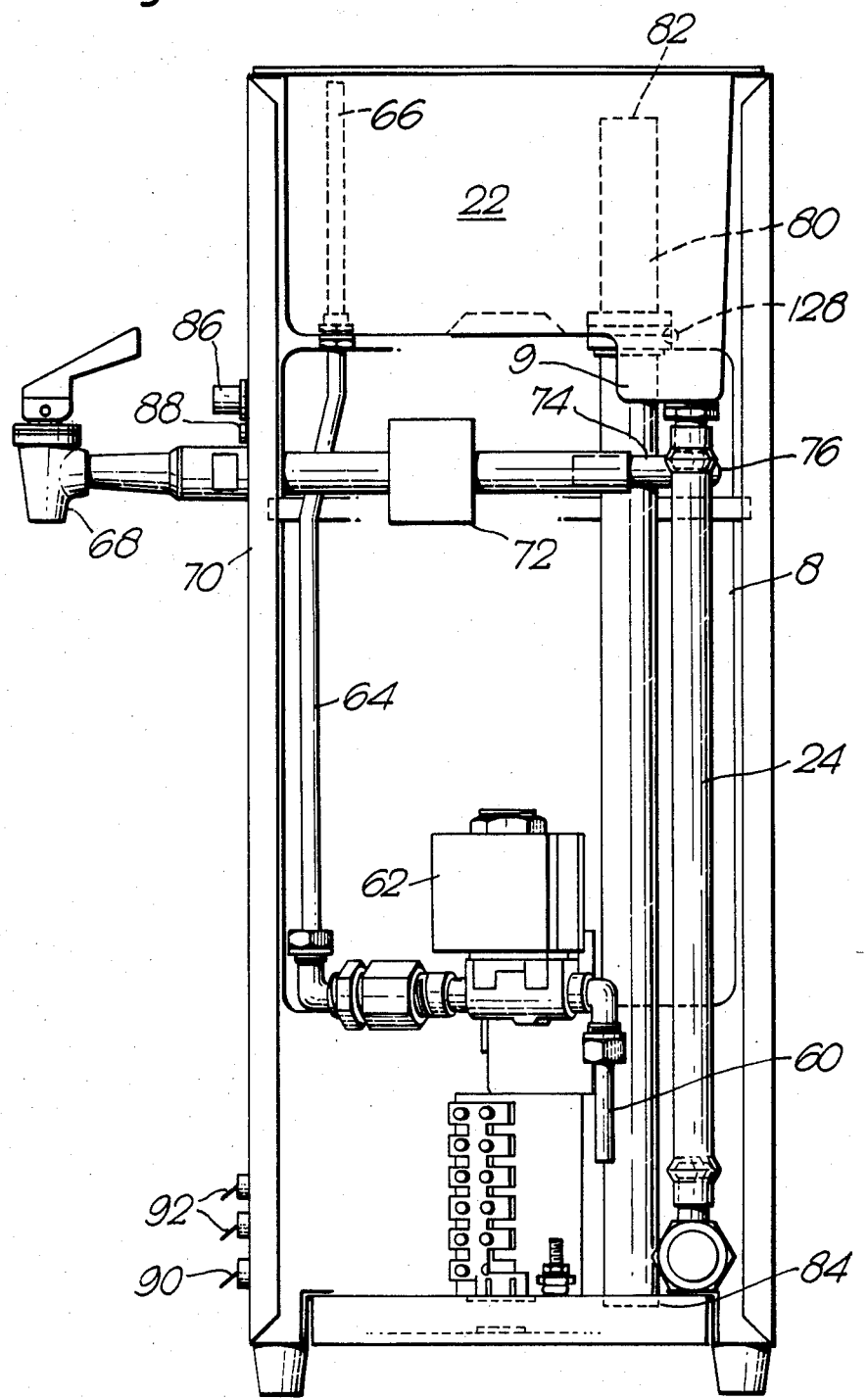
Figure 3:
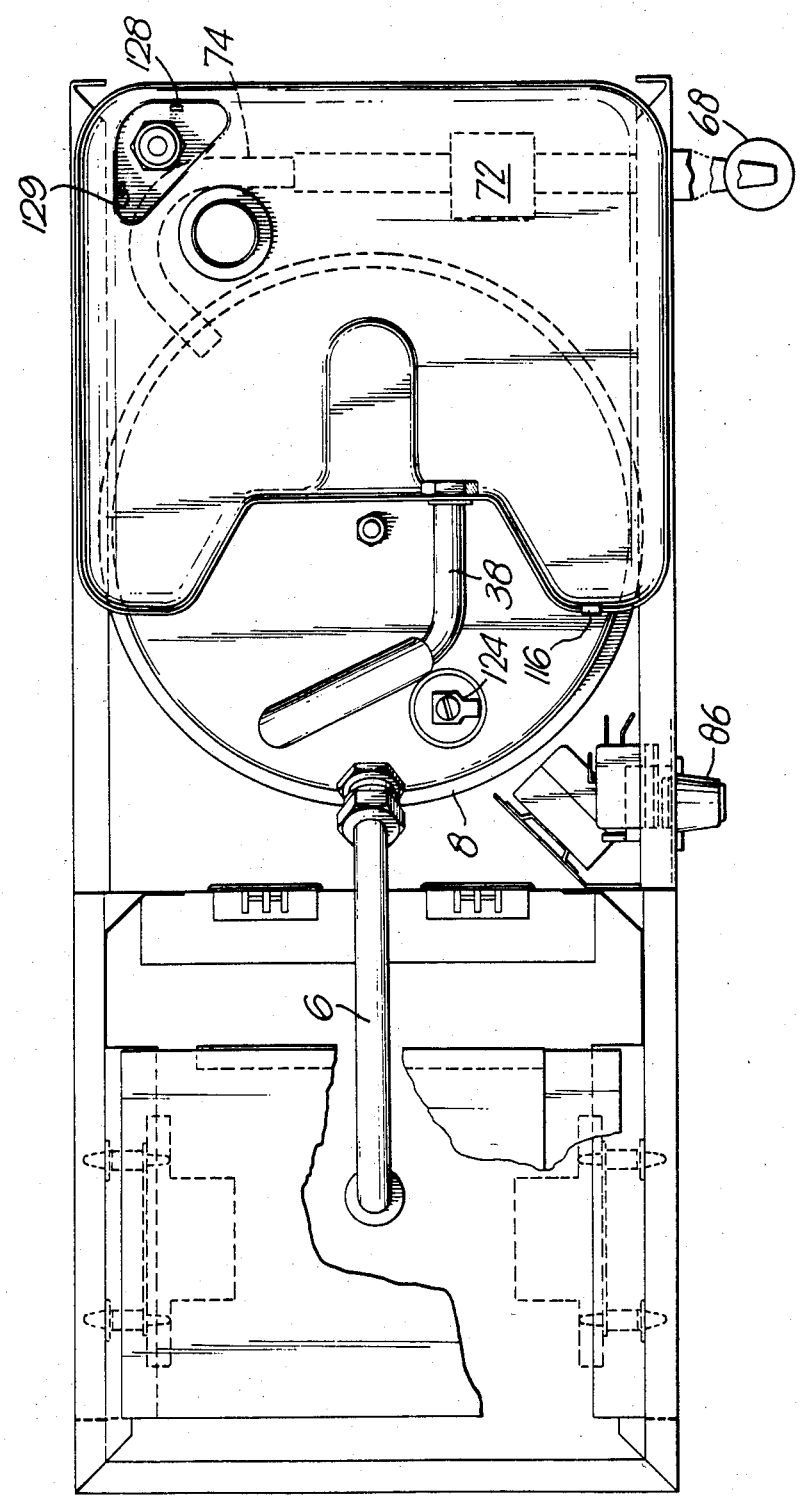
Figure 4:
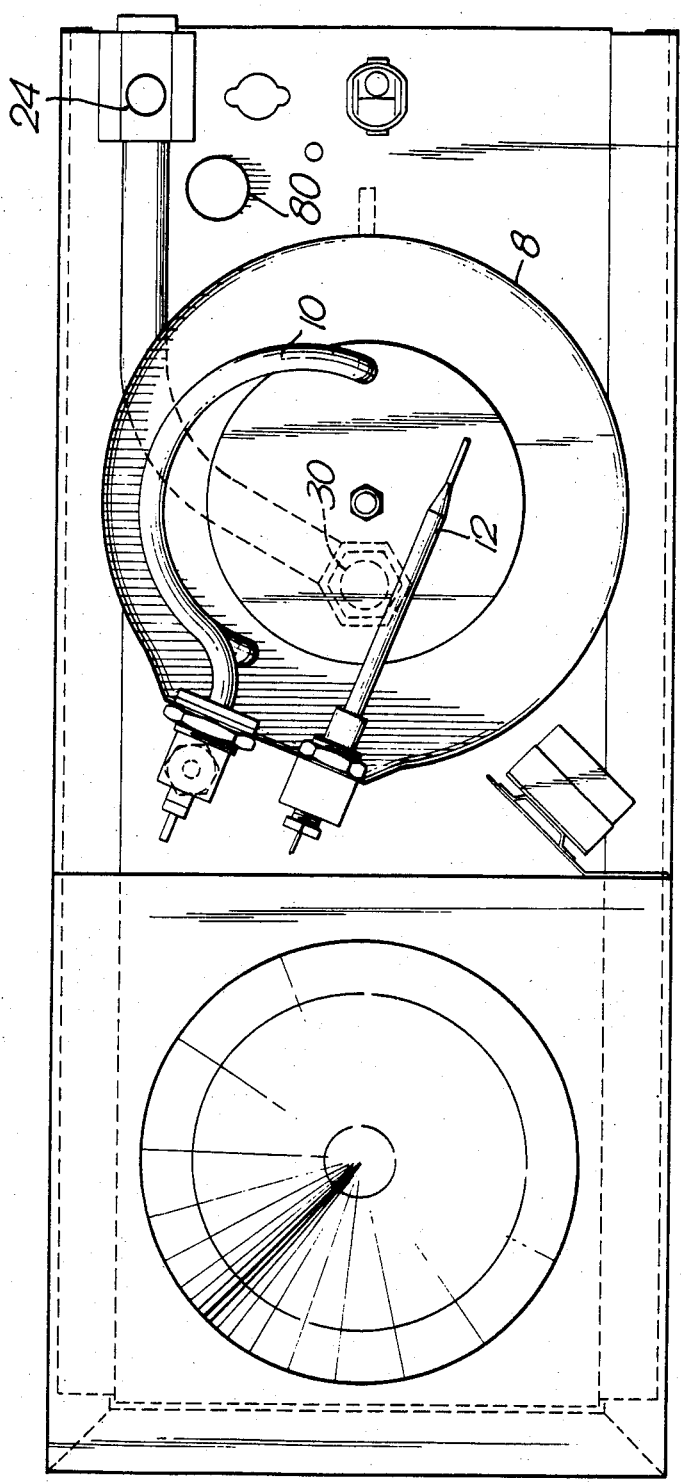
Figure 5:
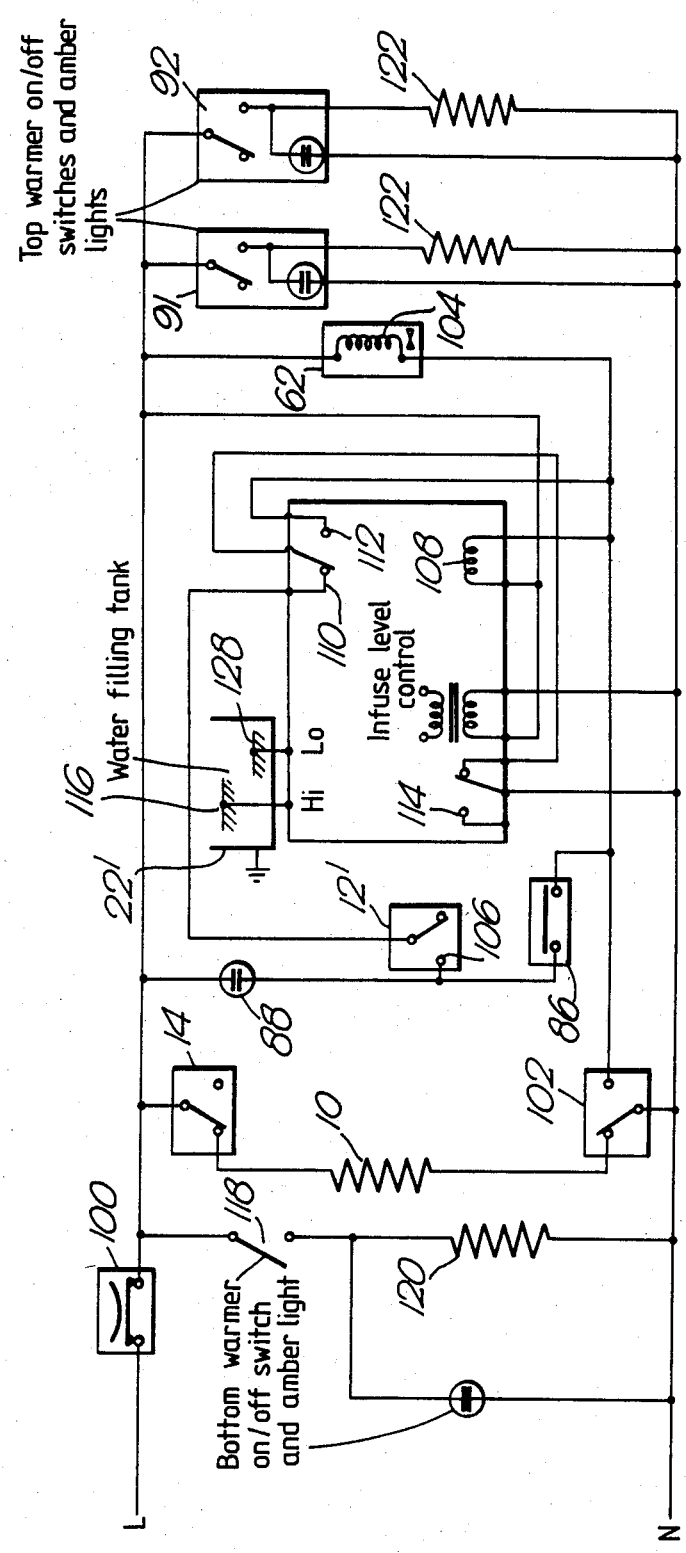
Figure 6:
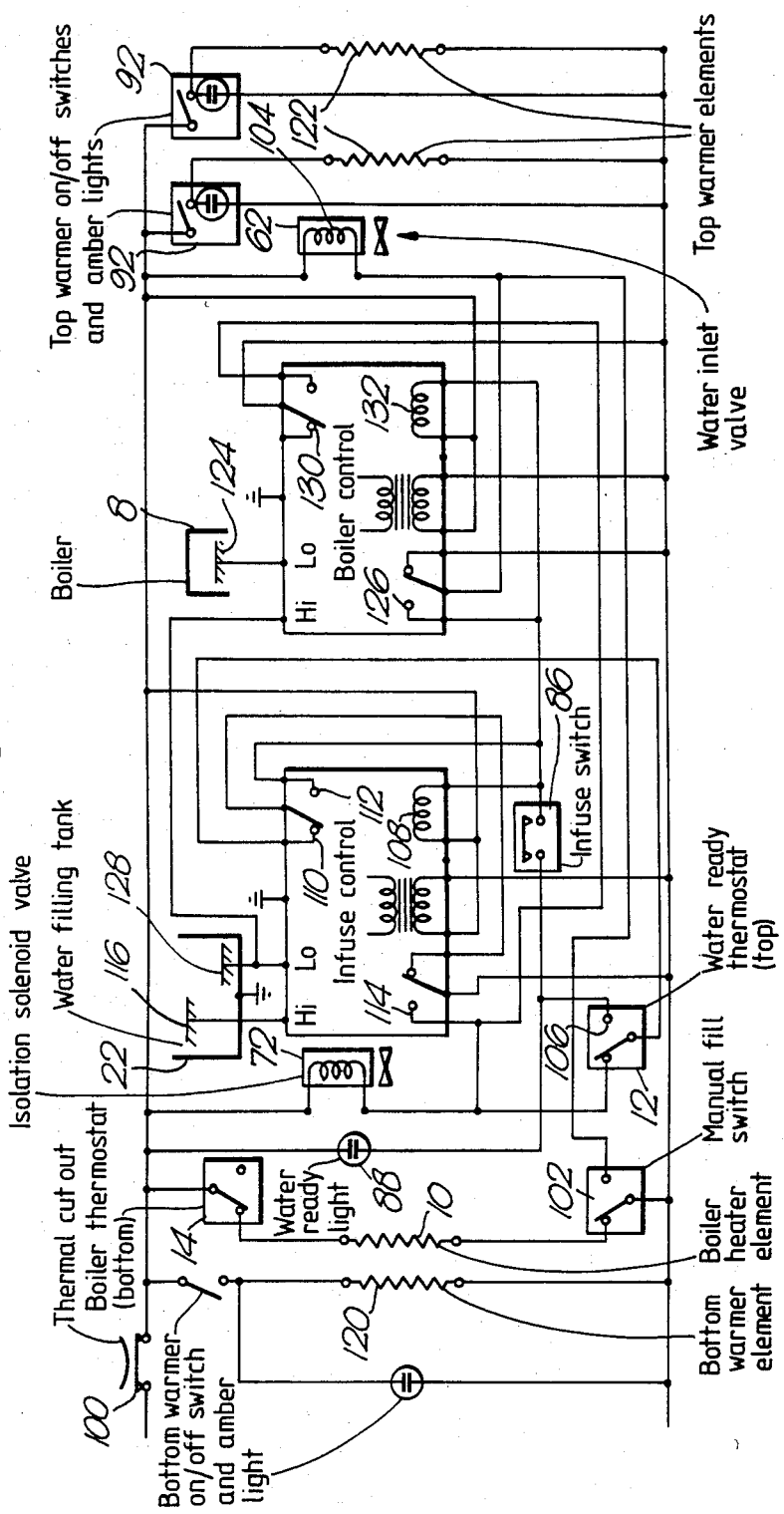
Figure 7:
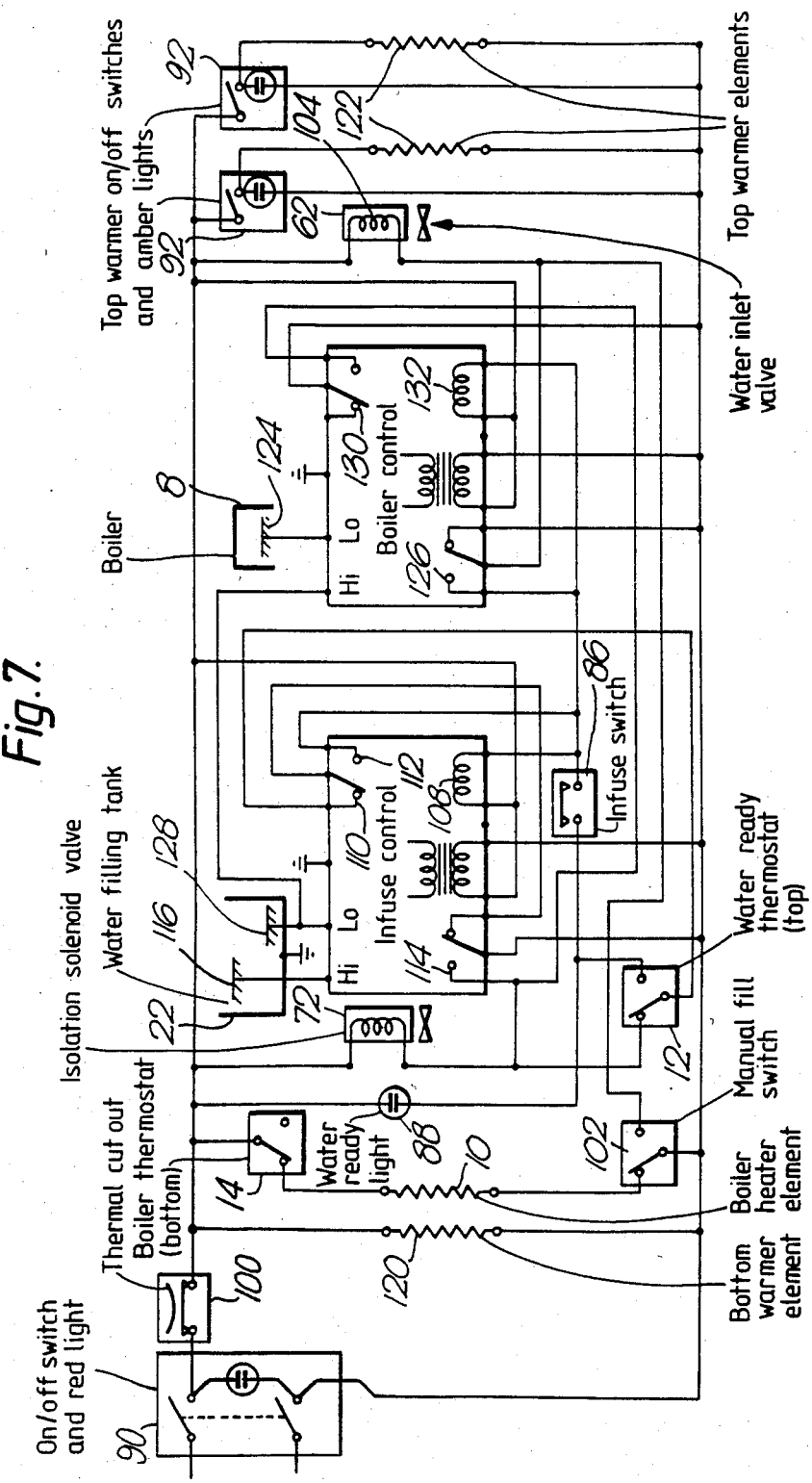

Embodiments of the invention will now be described by way of example with reference to the accompanying drawings in which:

FIG. 1 is a side sectional view of an automatic brewing apparatus according to the invention, and specifically with the tank 8 shown in section, FIG. 2 is a rear view of the apparatus of FIG. 1, FIG. 3 is a top plan sectional view of the apparatus of FIG. 1 taken at III—III, FIG. 4 is a top plan sectional view of the apparatus of FIG. 1 taken at IV—IV, FIG. 5 is a circuit diagram for one version of the apparatus of FIG. 3 without a dispensing tap, FIG. 6 is a circuit diagram for the apparatus of FIG. 1 with a dispensing tap, and FIG. 7 is a modified circuit diagram for the apparatus of FIG. 1 with a dispensing tap.

The apparatus shown in FIGS. 1 to 4 is a coffee or tea brewing apparatus having an infuser pan 2, a spray head 4 and a conduit 6 leading from the spray head to the top of a hot water tank 8, the conduit 6 connecting as a siphon tube from the top of the tank. The tank 8 has a heater element 10, an upper thermostat 12 and a lower thermostat 14. Upper thermostat 12 is located about a third of the way down from the top 16 of the tank so as to measure the temperature (which when hot is between about 90° and 95° C.) and the top third of the volume of the tank is equivalent to a water charge for one infusion charge for receptacle 20 positioned below the infuser pan 2. Thermostat 14 is arranged to measure the water temperature at the bottom of the tank between about 92° and 97° C.

Above the tank 8 is a plumbed in filler tank 22 connected via a conduit 24 to a T-junction 26, thence via a conduit 28 to a T-junction 32 and via a conduit 29 which opens into an inlet 30 of the tank. The lower leg of the T-junction 32 extends downwards to a drain plug 34 which also serves to fasten junction 32 to a plate 35 which by means of conduit 29 supports tank 8. A further drain plug 37 is provided on junction 26. At the top of the tank 8 is an air outlet 36 connected via a conduit 38 to an inlet 40 at the top of filler tank 22. A baffle plate 50 is provided above inlet 30 to divert the rising water during a filling operation away from the centre of the tank and encourage the water to form a distinct cold water strata.

A water mains connection pipe 60 (see FIG. 2) leads to a water inlet solenoid valve 62. The latter is connected by conduit 64 to an inlet 66 in filler tank 22.

An emergency overflow pipe 80 provides an emergency outlet 82 from the filler tank 22 to vent through the apparatus to an outlet 84 below the apparatus. This is in case of failure of valve 62 remaining open so that water can overflow through the apparatus without damaging any electrical equipment.

An infusion switch 86 and water ready lamp 88 are mounted on the side of casing 70. A machine on/off switch 90 and top heater switch or switches 92 are also mounted on side of casing 70. The circuit diagram for an automatic brewing apparatus without a side water draw-off tap is shown in FIG. 5 and includes a thermal cut out 100 which operates to disconnect the electrical supply to the main heater 10 if the apparatus overheats.

A water level probe 124 for tank 8 consisting of a stainles steel screw extending down from the tank top (FIG. 1) and mounted in an insulating block is at a level about 2 mm below the tank top. In the filler tank 22 a high level water probe 116 is at a level of about 1 mm below the top of pipe 80 and a low level probe 128 is about level with the main part of tank 22 at the top of pocket 9 of tank 22. As tank 22 is made of plastics an earth 129 is provided at the bottom of pocket 9.

In one embodiment a water draw-off tap 68 is provided on the side of the casing 70 of the apparatus and is connected via an isolation solenoid valve 72 to a conduit 74 connected in turn to a water outlet 76 in the top third of tank 8. This embodiment is later described with reference to the circuit diagram of FIG. 6. In another embodiment the tap 68 is omitted and this embodiment is later described with reference to the circuit diagram in FIG. 5.

The circuitry for the apparatus is shown in FIGS. 5 to 7 and will be described below.

The operation of the apparatus shown in FIGS. 1 to 4 is as follows:

When the apparatus is first to be filled with water a manual fill switch 102 is moved from the position shown in FIG. 5 to make a circuit through the solenoid 104 of the water inlet valve 62 so that this is opened allowing water from the mains supply to enter the filler tank 22 until the apparatus is full. The fill switch 102 is then moved to the position shown in FIG. 5. In this position the main boiler heater element 10 is energised through the bottom thermostat 14 to heat the water in the tank. When the water in the upper portion of the tank above the probe of the upper thermostat 12 has been heated to the desired temperature of about 90° C. to 95° C., the thermostat 12 operates from the position shown in FIG. 5 to make with the contact 106. The water ready light 88 is then lit showing that an infusion operation may take place.

When the infuse switch 86 is momentarily closed, the relay 108 is energised moving the switch 110 from the contact shown to a second contact 112. When in this position the relay 108 is energised through the connection 112 to keep the switch in that operative position. The solenoid 104 is then operated through the switch 110 and a further switch 114 to open the water inlet valve to allow water to enter the water filling tank from the mains. Infusion then takes place with the infused coffee or tea percolating through pan 2 into container 20 until the water level reaches the high level probe 116 in the water filling tank whereupon the switch 114 is operated to open the connection between the solenoid 104 and the neutral line thus closing the water inlet valve 62.

When the whole tank has reached the desired water temperature, the bottom thermostat 14 operates to deenergise the boiler heater element 10.

Manual switch 118 is provided to energise a bottom warmer element 120. Heating elements 122 for the top warmer elements are energised on closure of switches 92.

The infusion switch 86 cannot be operated to open the water inlet valve until the water ready light 88 is lit and able to pass current. Hence, coffee infusion cannot take place until the water is at the desired temperature.

It will of course be appreciated that a mains on/off switch for the boiler heating element may be provided if desired.

The wiring diagram illustrated in FIG. 6 is similar to that described with reference to FIG. 5 except that it illustrates the apparatus with a sided water draw-off tap.

When the water in the top portion of the boiler tank is being heated to the desired temperature, a tap isolation valve 72 remains closed with the solenoid energised, the circuit being made through the top thermostat 12, the relay switch 110 and the level switch 114. When the top thermostat 12 is operated to make the circuit through the water ready lamp 88 then the circuit through the solenoid of the valve 72 is broken at the top thermostat, and the valve 72 is opened allowing hot water to be drawn off from the tap. When the thermostat 12 operates to change the switch 106 because the water in the top portion of the boiler tank has dropped below the required temperature, then the valve 72 again closes.

When water is being drawn off through the tap, the water level drops below the level probe 124 located in the top of the boiler between the point of take off for the spray head and the point of take off for the tap. When the water level drops below this probe, a switch 126 moves so as to complete the circuit through the solenoid 104 of the water inlet valve 62 so as to open this valve. Water then enters the apparatus until the level reaches the low water probe 128 in the water filling tank which operates the switch 126, where upon the circuit to the water inlet valve 62 is made by causing the water supply to be shut off.

When the infusion switch 86 is pressed the isolation solenoid valve 72 is closed by the hold-on switch 130 by operation of the coil 132 within the boiler control unit. This prevents water from being drawn off through the tap during infusion of coffee or tea. A two-pole on-off switch 90 with indicator lamp may be provided (see FIG. 7).

What is claimed is:

1. A hot water tank comprising a tank body extending between a tank top and a tank bottom,
   a water supply connected to an inlet in said tank bottom,
   means for heating the water within said tank body,
   a water tap outlet in said body at a point between said top and bottom and substantially above said bottom,
   a water control valve in fluid connection with said outlet,
   a water draw-off tap in fluid connection with said valve beyond said valve with respect to said outlet,
   temperature gauging means operable to gauge the temperature of water above said tap outlet,
   control means connected to said temperature gauging means, said valve and control means being functional so as to open said valve to allow said tap to draw off hot water from said body when said gauging means gauges a temperature at least as high as a predetermined temperature;
   whereby the user cannot draw the water from said body until the temperature of the water reaches the predetermined temperature.

2. Apparatus for brewing a beverage such as coffee or tea comprising an infuser pan arranged to fill a receptacle,
   a spray head above said pan to sprinkle hot water into said pan,
   a hot water tank having a top and bottom,
   said tank connected by means of a first conduit to said spray head,
   said conduit extending from a position at and in communication with said tank top,
   heater means associated with said tank to heat water in said tank,
   a water supply connected to an inlet in said tank bottom,
   a water tap outlet in said tank at a point between said top and bottom and substantially above said bottom,
   a water control valve in fluid communication with said outlet,
   a water draw-off tap in fluid connection with said valve beyond said valve with respect to said outlet,
   temperature gauging means operable to gauge the temperature of water above said tap outlet, control means connected to said temperature gauging means, said valve and control means being functional so as to allow said tap to draw-off hot water from said body when said gauging means gauges a temperature at least as high as a predetermined temperature, whereby user cannot draw water from said tank until the temperature reaches the predetermined temperature.

3. A hot water tank as claimed in claim 1 wherein said temperature gauging means comprises a thermostat probe positioned in said tank at a position in an upper area of the tank but below said draw-off tap outlet.

4. Apparatus as claimed in claim 2 wherein said temperature gauging means comprises a thermostat probe positioned in said tank at a position in an upper area of the tank at least as high as said draw-off tap outlet.

5. Apparatus as claimed in claim 4 further comprising infusion initiating means comprising an infusion switch means connected to said control means, interlock means preventing initiation of infusion until water above said tap outlet in said upper area of the tank is at a temperature at least as high as a predetermined desired temperature.

6. Apparatus as claimed in claim 5 wherein said control means is operable to prevent said draw-off tap valve opening whilst said infusion switch means is controlling water to be allowed to flow from said supply into said tank to cause hot water to flow from said tank top to said spray head.

7. Apparatus as claimed in claim 6 wherein said water supply comprises in said supply a further valve controlled by said control means.

8. Apparatus as claimed in claim 7 wherein said water supply further comprises a source of water connected by said further valve to a subsidiary tank mounted above said water tank, said subsidiary tank connected for fluid communication to said water tank bottom.

9. Apparatus as claimed in claim 8 wherein said subsidiary tank is provided with a first water level detector above said water tank top, and said water tank has a second water level detector at said tank top, said level detectors co-operating with said control means to ensure replenishment of said water tank and to enable infusion to take place.

10. A tank as claimed in claim 1 wherein a second temperature gauging means comprising a second thermostat probe is provided in said tank at a position in a lower area of said tank below said draw-off tap outlet, said second probe connected to said control means to power said heater means to heat water in said hot water tank.

11. Apparatus as claimed in claim 2 wherein a second temperature gauging means comprising a second thermostat probe is provided in said tank at a position in a lower area of said tank below said draw-off tap outlet, said second probe being connected to said control means to power said heater means to heat water in said hot water tank.

* * * * *